(12) United States Patent
Eyring et al.

(10) Patent No.: US 9,044,770 B1
(45) Date of Patent: Jun. 2, 2015

(54) ANIMAL DETERRENT DEVICE

(75) Inventors: Stuart Eyring, Bountiful, UT (US);
Karl L. Connolly, Brigham City, UT (US); Landon T. Gwilliam, Salt Lake City, UT (US)

(73) Assignee: Orbit Irrigation Products, Inc., North Salt Lake, UT (US)

( * ) Notice: Subject to any disclaimer, the term of this patent is extended or adjusted under 35 U.S.C. 154(b) by 507 days.

(21) Appl. No.: 13/397,499

(22) Filed: Feb. 15, 2012

(51) Int. Cl.
*A01G 27/00* (2006.01)
*B67D 7/08* (2010.01)
*G08B 23/00* (2006.01)
*B05B 12/12* (2006.01)

(52) U.S. Cl.
CPC ............... *B05B 12/122* (2013.01); *B05B 12/12* (2013.01)

(58) Field of Classification Search
CPC .... B05B 12/12; B05B 12/122; B05B 12/004; A01G 25/16; A01G 27/03
USPC .............. 239/63, 69, 71, 73; 340/541, 573.1, 340/573.2, 573.4; 119/712
See application file for complete search history.

(56) References Cited

U.S. PATENT DOCUMENTS

| | | | | |
|---|---|---|---|---|
| 5,009,192 | A * | 4/1991 | Burman | 119/720 |
| 5,458,093 | A * | 10/1995 | MacMillan | 119/720 |
| 5,892,446 | A * | 4/1999 | Reich | 340/573.1 |
| 6,147,609 | A * | 11/2000 | Spies | 340/573.2 |
| 6,337,635 | B1 | 1/2002 | Ericksen et al. | |
| 6,700,486 | B1 * | 3/2004 | Banki | 340/541 |
| 7,278,375 | B2 * | 10/2007 | Ross et al. | 119/719 |
| 7,690,146 | B2 * | 4/2010 | Jong et al. | 43/1 |
| 2005/0199842 | A1 * | 9/2005 | Parsons et al. | 251/129.04 |

OTHER PUBLICATIONS

Contech Electronics, Inc. (The product shown in Attachment A hereto was sold or offered for sale on or before Feb. 14, 2011).
Orbit Irrigation Products, Inc. (The products shown in Attachment B hereto were sold or offered for sale on or before Nov. of 2008.).
L.R. Nelson Corp. (The product(s) shown in Attachment C hereto were sold or offered for sale on or before Feb. 14, 2011).

* cited by examiner

*Primary Examiner* — Ryan Reis
(74) *Attorney, Agent, or Firm* — Austin Rapp & Hardman (57) ABSTRACT

A device for deterring entry of animals within an area is disclosed. The device may include a sprinkler for providing a fluid spray pattern to an area and a sprinkler valve having at least an open and closed state. A signal-transmitting component may be in electrical communication with the sprinkler valve. A motion sensor may be in electrical communication with the signal-transmitting component and a light sensor may be in electrical communication with the signal-transmitting component. The signal-transmitting component may comprise logic circuitry configured to transmit an open valve signal based on signals received from the motion sensor and the light sensor.

20 Claims, 7 Drawing Sheets

ANIMAL DETERRENT DEVICE

TECHNICAL FIELD

The present invention relates to a device for deterring entry of animals within an area.

BACKGROUND

It may be desirable to exclude animals from a particular area. For example, one may wish to exclude foraging animals from a garden area. Alternatively, one may wish to exclude a neighborhood's pets from a yard. Excluding these animals from a particular area can be time-consuming and frustrating. Accordingly, a device for deterring entry of animals within a specified area is disclosed.

BRIEF DESCRIPTION OF THE DRAWINGS

Embodiments of the invention will become more fully apparent from the following description and appended claims, taken in conjunction with the accompanying drawings. Understanding that these drawings depict only certain embodiments and are, therefore, not to be considered limiting of the invention's scope, the embodiments of the invention will be described with additional specificity and detail through use of the accompanying drawings, in which:

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

A device for deterring entry of animals within an area is disclosed. The animal deterrent device may include a sprinkler for providing a fluid spray pattern to an area. The device may further comprise a sprinkler valve having at least an open and a closed state.

A conduit may be coupled to both the sprinkler and the valve. The conduit places the valve in fluid communication with the sprinkler. A first coupling may be used for placing the valve in fluid communication with a pressurized fluid source.

A signal-transmitting component may be in electrical communication with the sprinkler valve. A motion sensor may be in electrical communication with the signal-transmitting component, and a light sensor may be in electrical communication with the signal-transmitting component. The signal-transmitting component may comprise logic circuitry configured to transmit an open valve signal based on signals received from the motion sensor and the light sensor.

In a first lighting-based mode, the logic circuitry may be configured to cause the signal-transmitting component to transmit the open valve signal when a light-detected signal from the light sensor indicates that the light sensor has detected light less than or equal to a first threshold of light and a motion-detected signal is received from the motion sensor.

In a second lighting-based mode, the logic circuitry may be configured to cause the signal-transmitting component to transmit the open-valve signal when the light-detected signal from the light sensor indicates that the light sensor has detected light greater than or equal to a second threshold of light and the motion-detected signal is received from the motion sensor. The first threshold of light may be equal to the second threshold of light.

In a third lighting-based mode, the logic circuitry may be configured to cause the signal-transmitting component to transmit the open valve signal when the motion-detecting signal is received from the motion sensor irrespective of the light-detected signal.

The device may further comprise a lighting-mode control having at least three positions: a first position corresponding to the first lighting-based mode, a second position corresponding to the second lighting-based mode, and a third position corresponding to the third lighting-based mode.

The motion sensor may further comprise a motion sensitivity component. The device may further comprise a sensitivity control for adjusting a sensitivity of the motion sensor via the motion sensitivity component.

The device may also comprise a duration control component for adjusting the duration in which the sprinkler valve remains in an open state in response to the motion-detected signal. In one embodiment, the device may comprise an override component configured to cause the signal-transmitting component to transmit an open-valve signal to the sprinkler valve in response to activation of an override control irrespective of signals sent by the motion sensor and the light sensor. The override control may be positioned on a remote control device that wirelessly communicates with the override component.

The logic circuitry may comprise a frequency detection component configured to determine a frequency of transmission of motion-detected signals transmitted by the motion sensor and may also comprise an adjustment component configured to increase a time between transmission of open-valve signals to the sprinkler valve if the frequency of transmission of the motion-detected signals exceeds a certain threshold within a specified period of time.

The device may further comprise a second coupling. The first and second couplings may be upstream relative to the sprinkler valve. The animal deterrent device may further comprise a third and fourth coupling. The third and fourth couplings may be downstream relative to the sprinkler valve.

In one embodiment, the sprinkler may comprise an impact sprinkler having a pivoting impact arm of a polymer-based material.

One embodiment of a device for deterring entry of animals within an area is further disclosed. This embodiment of the animal deterrent device may comprise a base defining a fluid conduit within the base. A sprinkler may be secured to the base and may be in fluid communication with the fluid conduit. A sprinkler valve may be secured to the base. The sprinkler valve may comprise an open state in which fluid flows through the fluid conduit and a closed state in which fluid flow through the conduit is obstructed. A first coupling may be coupled to the base and may be in fluid communication with the fluid conduit. A signal-transmitting component may be in electrical communication with the sprinkler valve. The signal-transmitting component may be coupled to the base. A motion sensor may be in electrical communication with the signal-transmitting component. The motion sensor may be coupled to the base. A light sensor may also be in electrical communication with the signal-transmitting component. The light sensor may be coupled to the base. Also, the signal-transmitting component may comprise logic circuitry configured to transmit an open-valve signal based on signals received from the motion sensor and the light sensor. The base may comprise one or more tube-shaped structures.

In a first lighting-based mode, the logic circuitry may be configured to cause the signal-transmitting component to transmit the open-valve signal when a light-detected signal from the light sensor indicates that the light sensor has detected light less than or equal to a first threshold of light and a motion-detected signal is received from the motion sensor.

In a second lighting-based mode, the logic circuitry may be configured to cause the signal-transmitting component to transmit the open-valve signal when the light-detected signal from the light sensor indicates that the light sensor has detected light greater than or equal to a second threshold of light and the motion-detected signal is received from the motion sensor.

The device may further comprise a duration control component for adjusting the duration in which the sprinkler valve remains in the open state in response to the motion-detected signal. The device may further comprise an override component configured to cause the signal-transmitting component to transmit an open valve signal to the sprinkler valve in response to activation of an override control irrespective of signals sent by the motion sensor and the light sensor.

Various aspects of the disclosure are described below. It should be apparent that the teachings herein may be embodied in a wide variety of forms and that any specific structure, function, or both, being disclosed herein is merely representative. Based on the teachings herein, one skilled in the art should appreciate that an aspect disclosed herein may be implemented independently of any other aspects and that two or more of these aspects may be combined in various ways. For example, an apparatus, or device, may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Reference to "an embodiment" or "one embodiment" in this disclosure refers to one or more features of the disclosed device that may be combined with other features disclosed herein and is not limited to a specific iteration or configuration of the disclosed subject matter.

Figure 1:
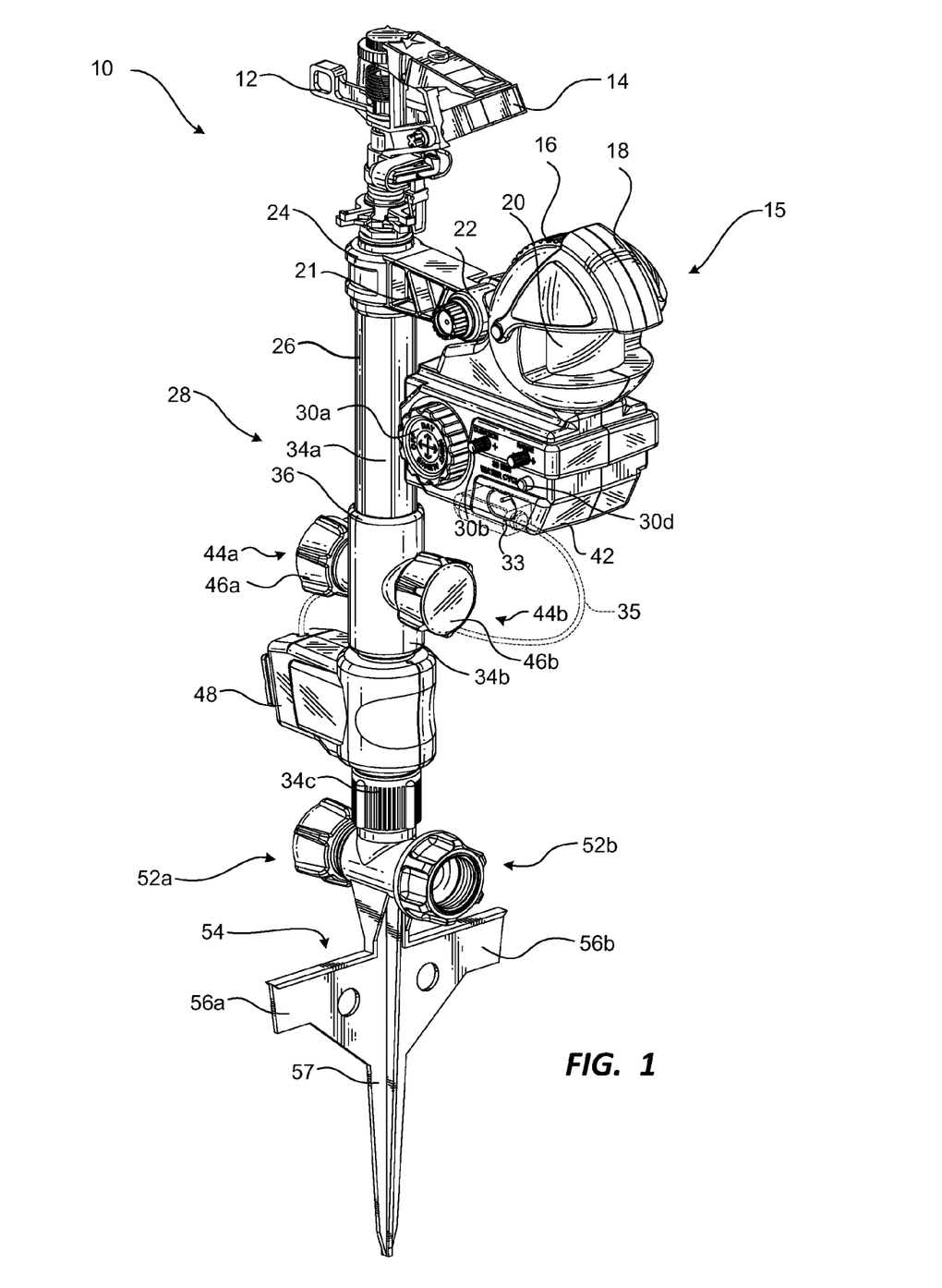
FIG. 1 is a perspective view of one embodiment of a device for deterring the entry of animals into a specific area, that is, an animal deterrent device.

FIG. 1 is a perspective view of one embodiment of a device 10 for deterring entry of animals within a specific area. The animal deterrent device 10 may comprise a sprinkler 12, an arm assembly 15, a base 28, a valve 48, one or more couplings 44a-b, 52a-b and a ground stake 54. The device 10 may further comprise one or more sensors (e.g., a motion and/or light sensor) disposed within a sensor enclosure 16. In response to a signal generated based on information received from the one or more sensors, a signal is sent to open the valve 48, thereby activating the sprinkler 12 and deterring animals from entering the area into which a spray pattern of the sprinkler 12 is directed.

As illustrated in FIG. 1, the sprinkler 12 may comprise an impact rotor sprinkler 12 including a pivoting arm 14. Of course, other types of sprinklers may be utilized in connection with the device 10, such as a spray-head sprinkler or gear-driven sprinkler. In operation, when an impact rotor sprinkler 12 is utilized, the impact of the pivoting arm 14 on the sprinkler 12 and the disruption of the pivoting arm 14 of the fluid stream proceeding from the sprinkler 12 generate a startling noise that further serves to drive animals away from the sprinkler 12 and the area covered by the fluid stream.

The device 10 may further comprise an arm assembly 15. With reference now to both FIGS. 1 and 2A, the arm assembly 15 may comprise a first rotational sleeve 24, an arm 21, a pivot point 22, an opening 23, a sensor enclosure 16, and a body 42. The first rotational sleeve 24 may be generally cylindrical in shape and allow rotation of the arm assembly 15 with respect to the conduit 26. In an alternative embodiment (not shown), the arm assembly 15 is secured to the conduit 26 in a fixed position such that the arm assembly 15 is not permitted to rotate with respect to the conduit 26. The first rotational sleeve 24 is secured to or integral with the arm 21.

Figure 2A:
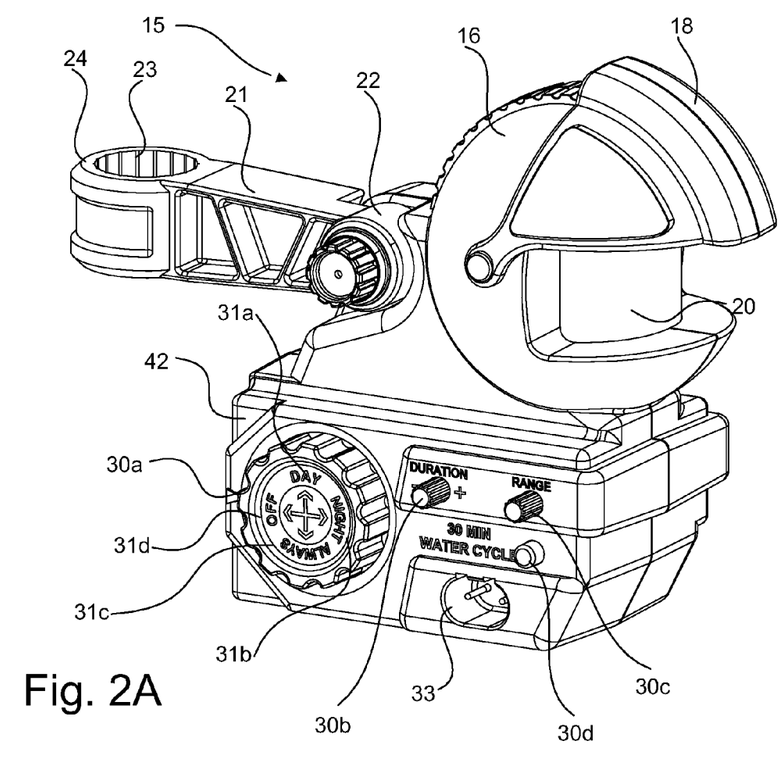
FIGS. 2A and 2B provide perspective views of an embodiment of an arm assembly for the animal deterrent device of FIG. 1.

The arm 21 may be further secured to or integral with a pivot point 22. The pivot point 22 enables the sensor enclosure 16 and body 42 to pivot with respect to the arm 21. The pivot point 22 allows the sensor enclosure 16 to pivot along a single axis. In alternative embodiments, the pivot point 22 enables pivoting of the sensor enclosure 16 and body 42 along multiple axes with respect to the arm 21.

The sensor enclosure 16 may further comprise a retractable visor 18 and a sensor window 20. The sensor enclosure 16 houses or protects various types of sensors, such as a motion sensor and/or a light sensor (shown in subsequent figures).

In one embodiment, the retractable visor 18 may be rotated, or pivoted, such that the retractable visor 18 is positioned over the sensor window 20. In this position, the retractable visor 18 may serve various purposes, such as preventing the detection of motion or protecting the sensor window 20 from potential damage. In an alternative embodiment, the retractable visor 18 is omitted from the device 10, and the features identified by reference numeral 18 may comprise an integral (non-pivotable) portion of the sensor enclosure 16.

The sensor window 20 may be transparent or translucent. The sensor window 20 enables one or more sensors disposed within the sensor enclosure 16 to detect motion and/or light while providing protection to the sensors disposed within the sensor enclosure 16.

The body 42 may be secured to or integrally formed with the sensor enclosure 16. The body 42 may further house and protect electronic components that control the operation of the device 10. These electronic components may be in electrical communication with sensors disposed within the sensor enclosure 16.

Various controls 30a-d may optionally be positioned within or on the body 42. The controls 30a-d enable a user to alter the settings of the device 10. For example, the device 10 may comprise a lighting-mode control 30a. As illustrated, the lighting-mode control 30a enables a user to select one of four lighting modes: a day mode 31a, a night mode 31b, an always mode 31c, and an off mode 31d. In the day mode 31a, the device 10 can operate such that the valve 48 is opened and the sprinkler 12 is activated in response to detected motion when day-time conditions are detected. Day-time conditions may be detected, for example, when the light sensor detects a level of light equal to or above a particular threshold.

In the night mode 31b, the device 10 activates the sprinkler 12 in response to motion when night-time conditions are detected, such as when light detected by a light sensor is equal to or below a particular threshold.

In the always mode 31c, the impact sprinkler 12 is activated whenever motion is detected, irrespective of whether day-time or night-time conditions are detected. In the always mode 31c, a light sensor may be deactivated to conserve power.

In the off mode 31d, the sprinkler 12 is never active, irrespective of detected conditions of light and/or motion. In the off mode 31d, both a motion and light sensor may be deactivated in order to conserve power.

Duration control 30b enables the user to increase or decrease the period of time during which the sprinkler 12 is activated in response to detection of specific conditions. For example, when motion is detected, the sprinkler 12 may be activated for a period of 15 seconds. Utilizing the duration control 30b, this period of time may be increased or decreased, as desired by a user.

The device 10 may further comprise a sensitivity control 30c. Utilizing the sensitivity control 30c, a user may increase or decrease the sensitivity of a motion detector within the device 10. Sensitivity control 30c may be advantageous, for example, to decrease the sensitivity of the motion sensor when the motion sensor is triggered in response to conditions that are unrelated to the presence of animals, such as when the motion of windblown trees triggers activation of the device 10. In addition, using the sensitivity control 30c, the sensitivity of a motion sensor may be increased to enable detection of smaller animals or more minute or fine movement of animals in the field of view of the motion sensor.

The arm assembly 15 may further comprise an override control 30d. The override control 30d triggers activation of the sprinkler 12 respective of any other settings on the device 10. For example, in the embodiment illustrated in FIGS. 1 and 2A, activation of the override control 30d may activate the sprinkler for a period of 30 minutes. Of course, in other embodiments, the override control 30d may trigger activation of the sprinkler for other periods of time, such as for 10 or 15 minutes.

The arm assembly 15 may also comprise a communication cable interface 33 for receiving a communication cable 35 (shown in phantom in FIG. 1) that places the electrical components within the body 42 and/or sensor enclosure 16 in electrical communication with the valve 48. In an alternative embodiment, an electrical communication channel between the electrical components and the valve 48 may be formed partially or completely within, for example, the body 42, sensor enclosure 16, arm 21 and conduit 26.

Figure 2B:
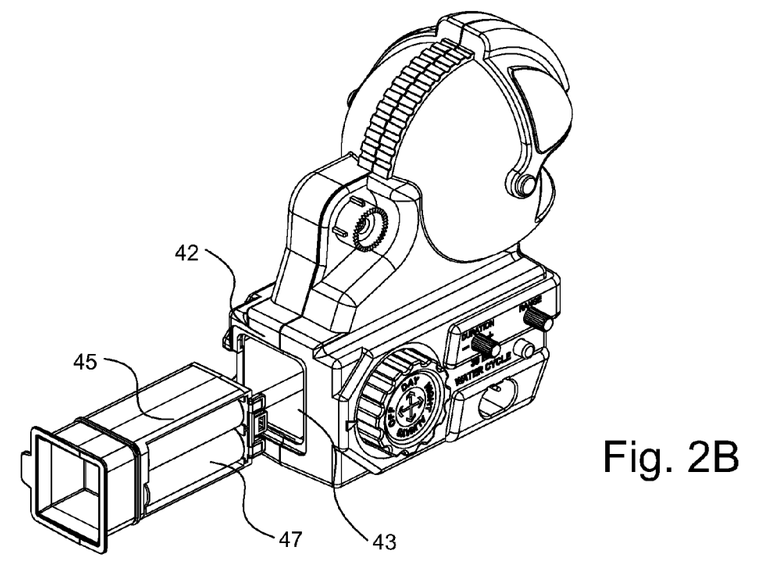

As illustrated in FIG. 2B, the body 42 may comprise a battery compartment 43. The battery compartment 43 is shaped to receive a battery cassette 45. In turn, the battery cassette 45 is shaped to receive one or more batteries 47. The batteries 47 (such as AA batteries) provide electrical power to the device 10. In an alternative embodiment, a non-portable power source provides electrical power to the device 10. For example, the device 10 may receive electrical power through wires coupled to an electrical power grid. The battery compartment 43 may also be partially or entirely disposed within the sensor enclosure 16.

The device 10 may further comprise a base 28. The base 28 defines a fluid conduit 26 through which fluid passes within the device 10 to or from one of the couplings 44a-b, 52a-b and the sprinkler 12. In one embodiment, the fluid conduit 26 may comprise a series of one or more tube-shaped structures 34a-c. The fluid conduit 26 may be coupled to the sprinkler 12 and the valve 48 and may place the valve 48 in fluid communication with the sprinkler 12. The fluid conduit 26 may also be secured to and is in fluid communication with each of the couplings 44a-b, 52a-b. The arm assembly 15 may also be secured to the fluid conduit 26.

In one embodiment, a first and a second downstream coupling 44a-b are coupled to the conduit 26 via a second rotational sleeve 36. The second rotational sleeve 36 enables the first and second downstream couplings 44a-b to be rotated with respect to the conduit 26. In an alternative embodiment, the sleeve 36 is not rotatable but instead is fixed with respect to the conduit 26.

The first and second downstream couplings 44a-b are downstream with respect to the valve 48. In other words, fluid (e.g., water) from a pressurized power source flows first through the valve 48 and then through or to the first and second downstream couplings 44a-b. Because the first and second downstream couplings 44a-b are downstream with respect to the valve 48, the valve 48 controls whether fluid flows to and through the first and second downstream couplings 44a-b. The first and second downstream couplings 44a-b enable one or more conduits (e.g., hoses) and/or sprinklers to be coupled to the first or second downstream couplings 44a-b to be activated in response to activation, or opening, of the valve 48, e.g., in response to detection of motion. Thus, an entire network of sprinklers (not shown) may be controlled by the valve 48. As illustrated in FIG. 1, a first cap 46a may be positioned over the first downstream coupling 44a and a second cap 46b may be positioned over the second downstream coupling 44b, when the first and second downstream couplings 44a-b are not in use. The number of downstream couplings 44a-b may be varied within the scope of the disclosed subject matter. In one embodiment, no downstream couplings 44a-b are included within the device 10.

Figure 3:
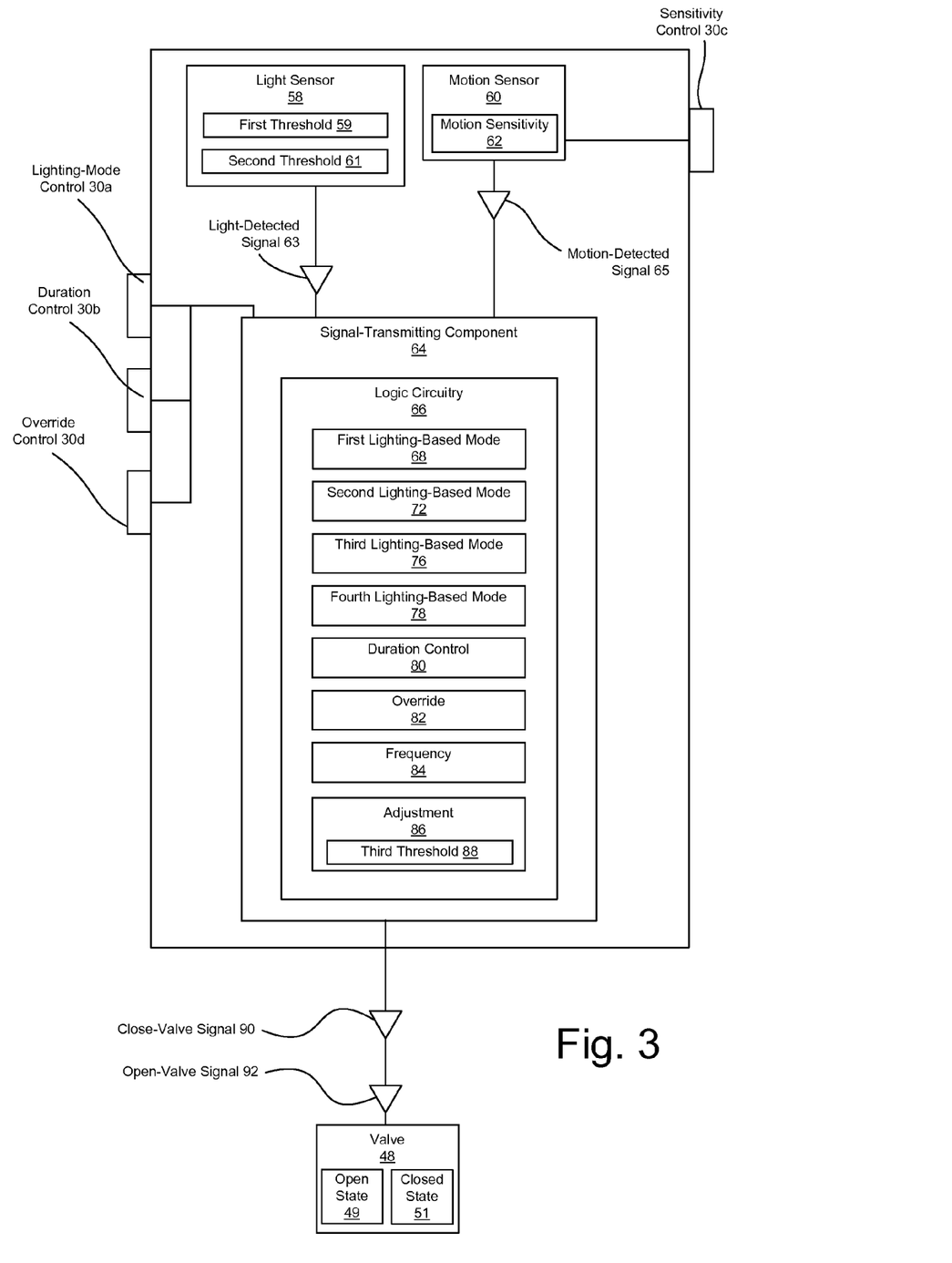
FIG. 3 comprises a block diagram illustrating electrical components of the device.

The valve 48 may be activated, or opened, in response to signals from a signal-transmitting component 64 (shown in FIG. 3). The signal-transmitting component 64 may be positioned within, for example, the sensor enclosure 16 and/or the body 42. In turn, the signal-transmitting component 64 may be in electrical communication with various sensors, such as a motion sensor and/or a light sensor. In one embodiment, the valve 48 comprises a latching valve 48. A latching valve 48 remains either open or closed in response to a single signal. In an alternative embodiment, the valve 48 remains either open or closed in response to a sustained or ongoing signal from a signal-transmitting component.

As indicated above, the device 10 may include one or more upstream couplings 52a-b. The upstream couplings 52a-b may be selectively coupled to a pressurized fluid source, a hose, or one or more sprinklers coupled in a serial or parallel arrangement. In one embodiment, a second upstream coupling 52b comprises an input coupling through which a pressurized fluid may be received from a pressurized fluid source. In such an embodiment, the first upstream coupling 52a may comprise an output coupling such that pressurized fluid from the pressurized fluid source may pass first through the second upstream coupling 52b and then pass through the first upstream coupling 52a to a hose and/or other sprinklers coupled to the first upstream coupling 52a. Of course, either the first or the second upstream couplings 52a-b could be utilized as either an input or an output coupling. As illustrated in FIG. 1, the first and second upstream couplings 52a-b are upstream with respect to the valve 48. Accordingly, the first and second upstream couplings 52a-b are not controlled by the valve 48, i.e., the valve 48 does not control whether fluid flows to the first and second upstream couplings 52a-b. In one embodiment, only a single upstream coupling 52b is included within the device 10. Alternatively, the device 10 may include more than two upstream couplings 52a-b.

The device may further comprise a ground stake 54. As noted above, the ground stake 54 is utilized to position the device 10 within a particular area of soil. The ground stake 54 may be embodied in various ways. For example, as illustrated in FIG. 1, the ground stake 54 may include a first ground stake wing 56a and a second ground stake wing 56b. The first and second ground stake wings 56a-b prevent or mitigate the possibility of rotation of the device 10 within the soil. Avoiding rotation of the device 10 within the soil is of significance when the device 10 is positioned by the user for the purpose of deterring entry to a particular area (e.g., a garden). If the device 10 were to rotate, such as when the impact sprinkler 12 is activated, the spray pattern from the impact sprinkler 12 may be directed to a different area than the area desired by the user. The ground stake 54 may further comprise a central extension 57. The central extension 57 provides for secure positioning of the ground stake 54 within the soil to mitigate the possibility of the impact sprinkler toppling during normal usage.

The base 28 may be secured to or integrally formed with a ground stake 54. The sprinkler 12, couplings 44a-b, 52a-b, sprinkler valve 48, and arm assembly 15 may be secured to the base 28.

FIG. 3 is a block diagram illustrating one embodiment of electrical components of the device 10. As indicated above, the device 10 may include a light sensor 58 and a motion sensor 60. In one embodiment, the light sensor 58 and motion sensor 60 may be positioned within the sensor enclosure 16.

The light sensor 58 may be in electrical communication with a signal-transmitting component 64. The light sensor 58 may transmit a light-detected signal 63 in response to the detection of light above, below or equal to a first threshold 59 and/or a second threshold 61. The thresholds 59, 61 may be established by a manufacturer of the device 10 or may be set or adjusted by a user. In one embodiment, when the device 10 is in a first-lighting based mode 68 (e.g., a night mode 31b), the light sensor 58 may transmit a light-detected signal 63 in response to detected light equal to or below a first threshold 59. When the device 10 is in a second lighting-based mode 72 (e.g., a day mode 31a), the light sensor 58 may transmit a light-detected signal 63 when the light detected is greater than or equal to a second threshold 61.

In one embodiment, only a single threshold 59 is utilized. In such an embodiment, when the device 10 is in a first lighting-based mode 68, a light-detected signal 63 is transmitted in response to detected light less than or equal to the first threshold 59. When the device 10 is in the second lighting-based mode 72, a light-detected signal 63 is transmitted in response to detected light equal to or greater than the first threshold 59.

In one embodiment, the light-detected signal 63 (if one is sent) has no impact on operation of the device 10 when the device 10 is in a third lighting-based mode 76 (e.g., an always mode 31c) or a fourth lighting-based mode 78 (e.g., an off mode 31d). In such an embodiment, when the device 10 is in the third lighting-based mode 76 or the fourth lighting-based mode 78, the light sensor 58 may be turned off in order to conserve energy.

As indicated above, the device 10 may comprise a motion sensor 60. The motion sensor 60 may be in electrical communication with the signal-transmitting component 64 and a sensitivity control 30c. This sensitivity control 30c is optional. The motion sensor 60 may include a motion sensitivity component 62. Utilizing the sensitivity control 30c in conjunction with the motion sensitivity component 62, the sensitivity of the motion sensor 60 may be adjusted. For example, the sensitivity of the motion sensor 60 may be adjusted to accommodate situations where the motion sensor 60 (and thus the device 10) are activated in situations where an animal is not present (e.g., the motion sensor 60 may be triggered by the movement of trees or shrubbery when it is windy) or when the motion sensor 60 is not sufficiently sensitive to detect the particular type of motion.

When motion is detected in accordance with the motion sensitivity setting 62 of the motion sensor 60, the motion sensor 60 transmits a motion-detected signal 65 to the signal-transmitting component 64.

As indicated above, the device 10 may comprise a signal-transmitting component 64. The signal-transmitting component 64 may be in electrical communication with the lighting-mode control 30a, the duration control 30b, the override control 30d, the light sensor 58, the motion sensor 60, and the valve 48. The signal-transmitting component 64 may comprise logic circuitry 66.

The logic circuitry 66 may define or comprise a first lighting-based mode 68, a second lighting-based mode 72, a third lighting-based mode 76, and a fourth lighting-based mode 78. The logic circuitry 66 may further comprise a duration control component 80, an override component 82, a frequency component 84, and an adjustment component 86. The lighting-based modes 68, 72, 76, 78 may be selected by a user utilizing a lighting-mode control 30a. In one embodiment, the first lighting-based mode 68 corresponds to a day mode 31a, the second lighting-based mode 72 corresponds to a night mode 31b, the third lighting-based-based mode 76 corresponds to an always mode 31c, and the fourth lighting-based mode 78 corresponds to an off mode 31d. As indicated above, the signal-transmitting component 64 may respond in various ways to received light-detected signals 63 and motion-detected signals 65 based on the mode 68, 72, 76, 78 in which the device 10 is currently set. The signal-transmitting component 64 and logic circuitry 66 may be formed of an integral set of components or a number of non-integral components.

In one embodiment, in the first lighting-based mode 68, the logic circuitry 66 is configured to cause the signal-transmitting component 64 to transmit the open-valve signal 92 when a light-detected signal 63 from the light sensor 58 indicates that the light sensor 58 has detected light less than or equal to a first threshold 59 of light and a motion-detected signal 65 is received from the motion sensor 60.

In a second lighting-based mode 72, the logic circuitry 66 may be configured to cause the signal-transmitting component 64 to transmit the open-valve signal 92 when the light-detected signal 63 from the light sensor 58 indicates that the light sensor 58 has detected light greater than or equal to a second threshold 61 of light and the motion-detected signal 65 is received from the motion sensor 60.

In a third lighting-based mode 76, the logic circuitry 66 may be configured to cause the signal-transmitting component 64 to transmit the open valve signal 92 when the motion-detecting signal 65 is received from the motion sensor 60 irrespective of the light-detected signal 63.

In the fourth lighting-based mode 78, the logic circuitry 66 may be configured to cause the signal-transmitting component 64 to never transmit the open valve signal 92, irrespective of any light-detected signal 63 and/or motion-detected signal 65. In such an embodiment, in the fourth lighting-based mode 78, the light sensor 58 and the motion sensor 60 may be turned off in order to conserve power.

In an alternative embodiment, the light sensor 58 does not utilize either the first threshold 59 or the second threshold 61. Instead, the light-detected signal 63 indicates a level of light detected. Processing to determine whether the level of light detected satisfies a particular threshold 59, 61 is made by the logic circuitry 66. Likewise, in one embodiment the motion-detected signal 65 indicates a level of motion detected by the motion sensor 60. The logic circuitry 66 may then determine whether the motion detected satisfies a particular threshold, which may be established by the manufacturer of the device 10 or by a user of the device 10.

The duration control component 80 may be in electrical communication with the duration control 30b. Utilizing the optional duration control 30b, a user may establish how long the valve 48 will remain open after an open-valve signal 92 is transmitted to the valve 48. This period of time can also be established by the manufacturer of the device 10, and may comprise, for example, 30 minutes, 15 seconds, or 1 hour. After the period of time has expired, a close-valve signal 90 is sent by the signal-transmitting component 64. In response to the receipt of the close-valve signal 90, the valve 48 enters a closed state 51, in which fluid is prevented from passing through the valve 48. In an alternative embodiment, the close-valve signal 90 is sent when detected motion falls below a certain threshold and/or when the light detected is determined to be equal to, less than, or greater than the first and/or second thresholds 59, 61.

The override component 82 may be in electrical communication with the override control 30d. In response to a user activating the optional override control 30d, an open valve signal 92 is sent to the valve 48 to place the valve 48 in an open state 49. The valve 48 may remain in an open state 49 for a period of time specified by the manufacturer of the device 10 or by a period of time specified by the user. When the period of time has expired, the close-valve signal 90 is transmitted to the valve 48 thereby placing the valve 48 in a closed state 51.

The logic circuitry 66 may further comprise a frequency component 84. The frequency component 84 tracks the frequency with which motion-detected signals 65 are sent to the signal-transmitting component 64 and/or the frequency with which open-valve signals 92 are sent to the valve 48. The frequency component 84 may work in conjunction with an adjustment component 86. If the frequency of motion-detected signals 65 or the open-valve signals 92 exceeds a third threshold 88 within a period of time, the adjustment component 86 reduces the frequency with which the signal-transmitting component 64 transmits the open valve signal 92 to the valve 48. The third threshold 88 is disposed or stored within the frequency component 84 or the adjustment component 86. Operation of the frequency component 84 and the adjustment component 86 may be beneficial if, for example, motion detected as a result of the movement of trees or shrubbery triggers the frequent transmission of open-valve signals 92 to the valve 48. In one embodiment, the logic circuitry 66 is configured to never transmit an open-valve signal 92 if the valve 48 is in an open state 49.

It should be understood that not all components of the device 10 are illustrated in FIG. 3. Also, in certain embodiments, one or more components illustrated in FIG. 3 may be omitted.

Figure 4:
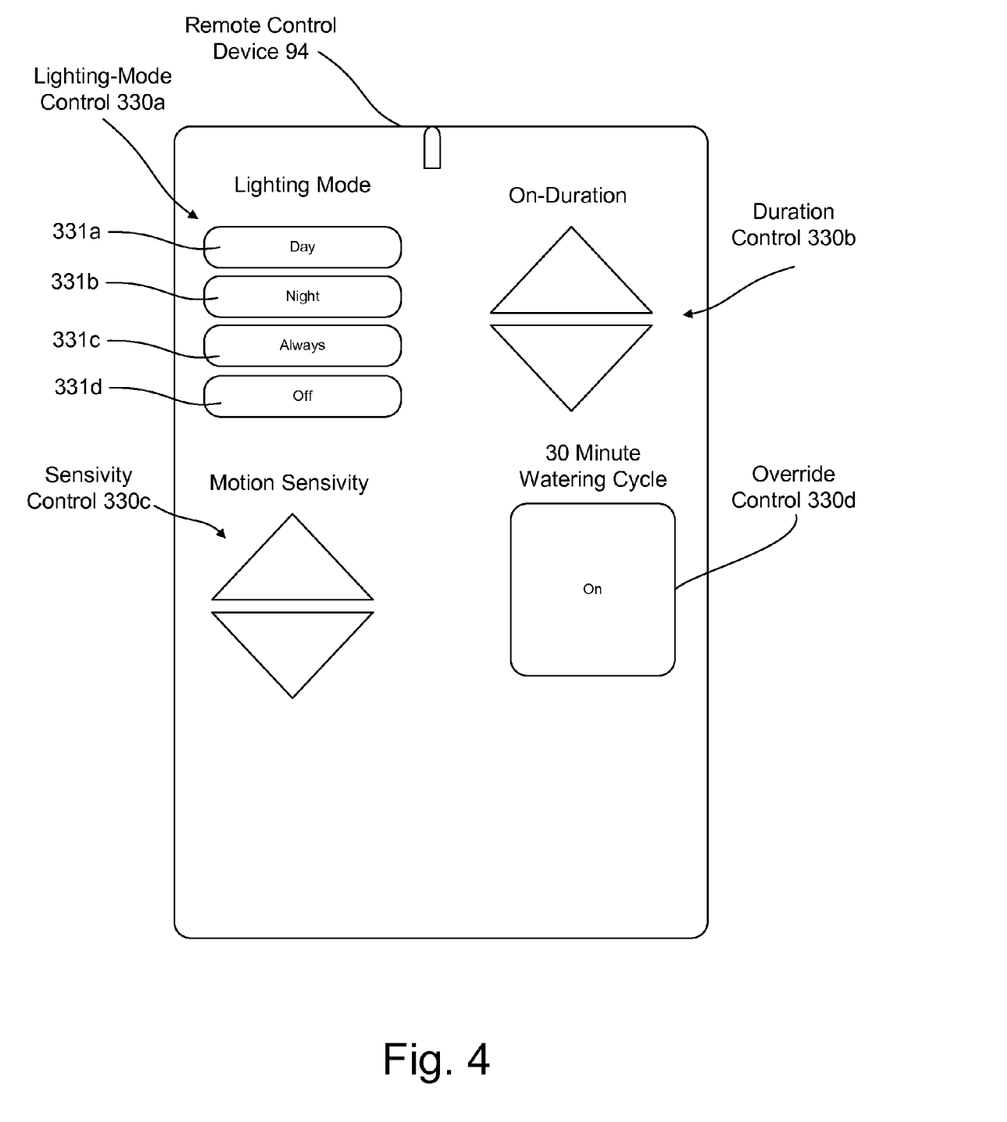
FIG. 4 illustrates a remote control device that may be utilized with the animal deterrent device.

With reference to FIG. 4, the animal deterrent device 10 may be further utilized in connection with a remote control device 94. The remote control device 94 may utilize a wireless transmitter or transceiver (not illustrated) for transmitting signals to the device 10. In one embodiment, the device 10 may further comprise a wireless receiver or wireless transceiver (not illustrated). The remote control device 94 may include a lighting-mode control 330a. Using the lighting-mode control 330a, the user may select a desired lighting mode. For example, a user may select a day mode 331a, a night mode 331b, an always mode 331c, or an off mode 331d.

Utilizing the duration control 330b, the user may increase or decrease the period of time during which the sprinkler 12 is activated following a triggering event (e.g., if the device 10 is in a day mode, when sufficient light and motion are detected).

The sensitivity control 330c may be utilized to increase or decrease the sensitivity of the motion sensor 60. The override control 330d may be utilized to activate the sprinkler 12, irrespective of detected lighting conditions or detected motion.

The remote control device 94 shown in FIG. 4 is merely illustrative. Various controls that are not illustrated in this figure may be included within the remote control device 94. In addition, one or more of the illustrated controls 330a-d may be omitted.

Figure 5:
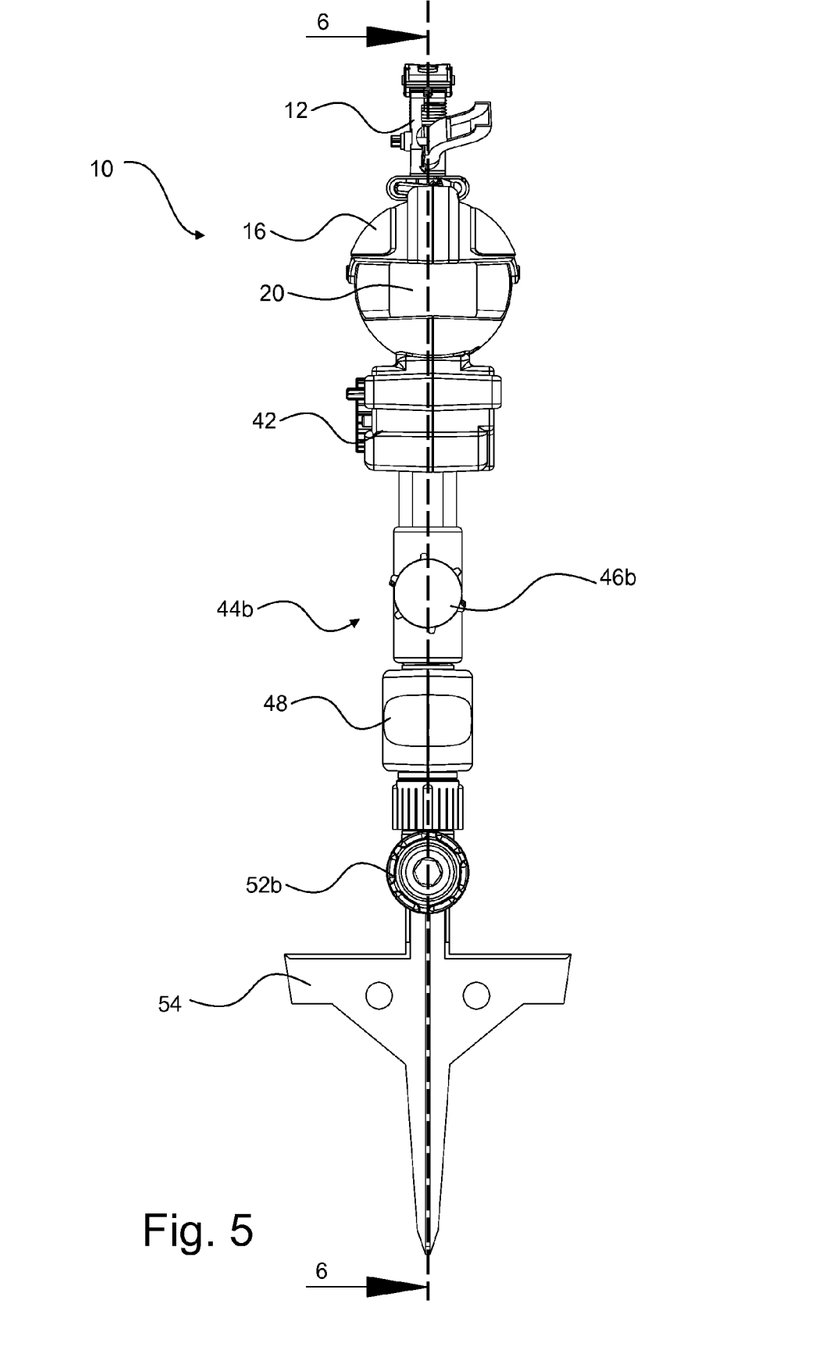
FIG. 5 is a side view of the animal deterrent device illustrated in FIG. 1.

FIG. 5 illustrates a device 10 for deterring entry of animals into a specific area. In particular, FIG. 5 provides a side view of the animal deterrent device 10. As with previous embodiments, the illustrated embodiment may include an impact sprinkler 12, a sensor enclosure 16, a sensor window 20, and a body 42. The view provided in FIG. 5 further illustrates that the device 10 comprises a second downstream coupling 44b, which is covered or sealed with a second cap 46b. FIG. 5 further provides a side view of the valve 48, the second upstream coupling 52b (without a cap), and the ground stake 54.

Figure 6:
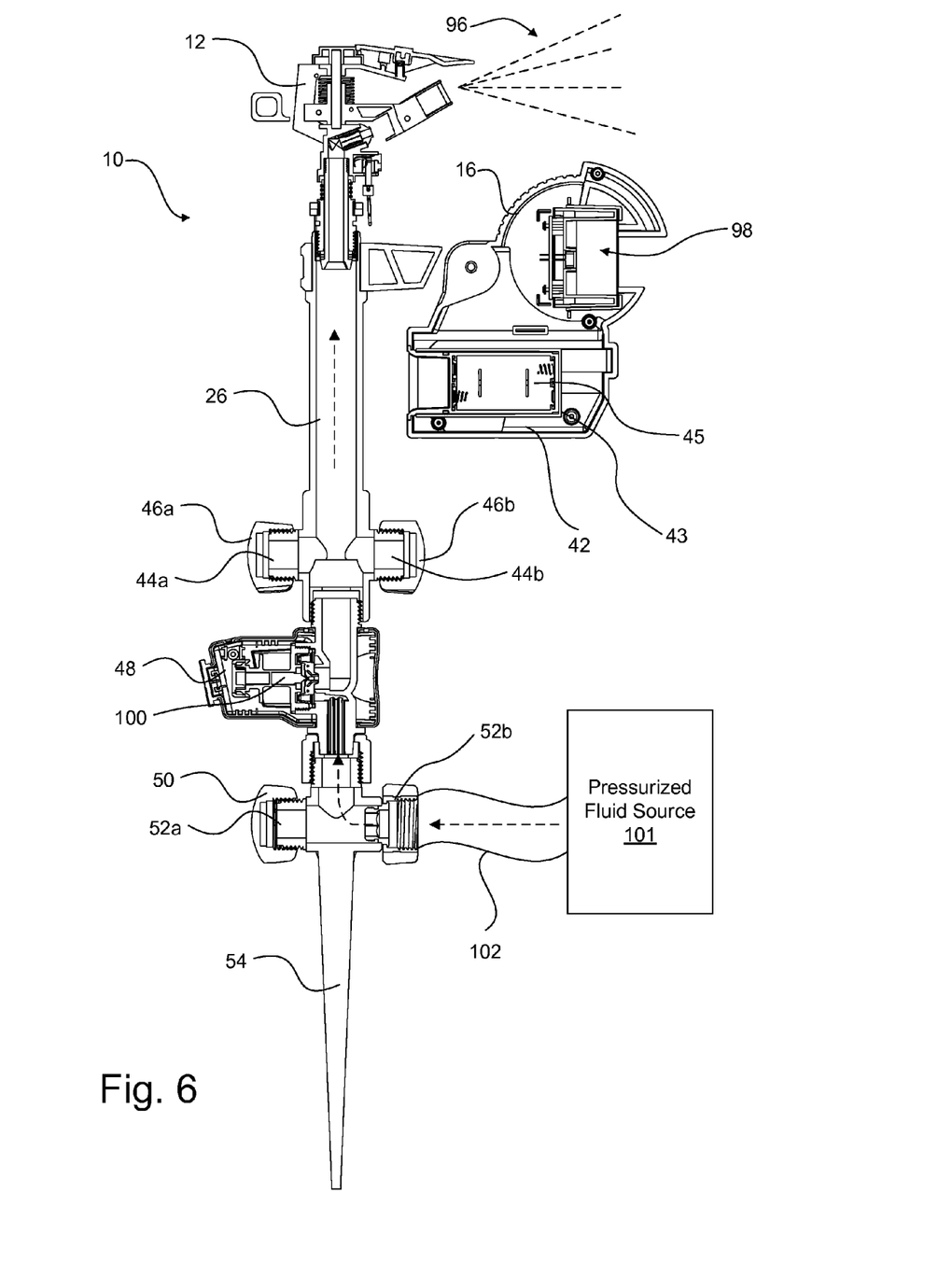
FIG. 6 illustrates a cross-sectional view of the animal deterrent device taken across the line 6-6 in FIG. 5, the animal deterrent device being shown together with a pressurized fluid source and a conduit intermediate a pressurized fluid source and the animal deterrent device.

FIG. 6 comprises a cross-sectional view of the device 10 taken across the line 6-6 of FIG. 5. In addition to illustrating the device 10, FIG. 6 shows a pressurized fluid source 101, which provides pressurized fluid to the device 10 via a conduit 102. The pressurized fluid travels from the conduit 102 through the second upstream coupling 52b and through the conduit 26 to the sprinkler 12. Accordingly, the impact sprinkler 12 emits the pressurized fluid in a spray pattern 96 to deter the entry of animals within an area covered by the spray pattern 96.

FIG. 6 also provides a cross-sectional view of the sensor enclosure 16 and body 42. The illustrated sensor enclosure 16 comprises components 98, which may comprise the light sensor 58 and/or the motion sensor 60 (which are illustrated in FIG. 3). Also, FIG. 6 provides a cross-sectional view of the battery compartment 43 and the battery cassette 45, which comprises a portion of the body 42.

A cross-sectional view of the first cap 46a and the second cap 46b is shown. Cross-sectional views of the first downstream coupling 44a and the second downstream coupling 44b are also illustrated.

A cross-sectional view of the valve 48 is also provided. Internal components within the valve 48 are illustrated, including the plunger 100, which moves in response to an applied electrical field, to open or close the valve 48. In one embodiment, the valve 48 may comprise a solenoid valve, such as the solenoid valve disclosed in U.S. Pat. No. 7,637,475.

FIG. 6 further provides cross-sectional views of the third cap 50, and the first upstream coupling 52a and the second upstream coupling 52b. The ground stake 54 is also illustrated in FIG. 6.

Figure 7:
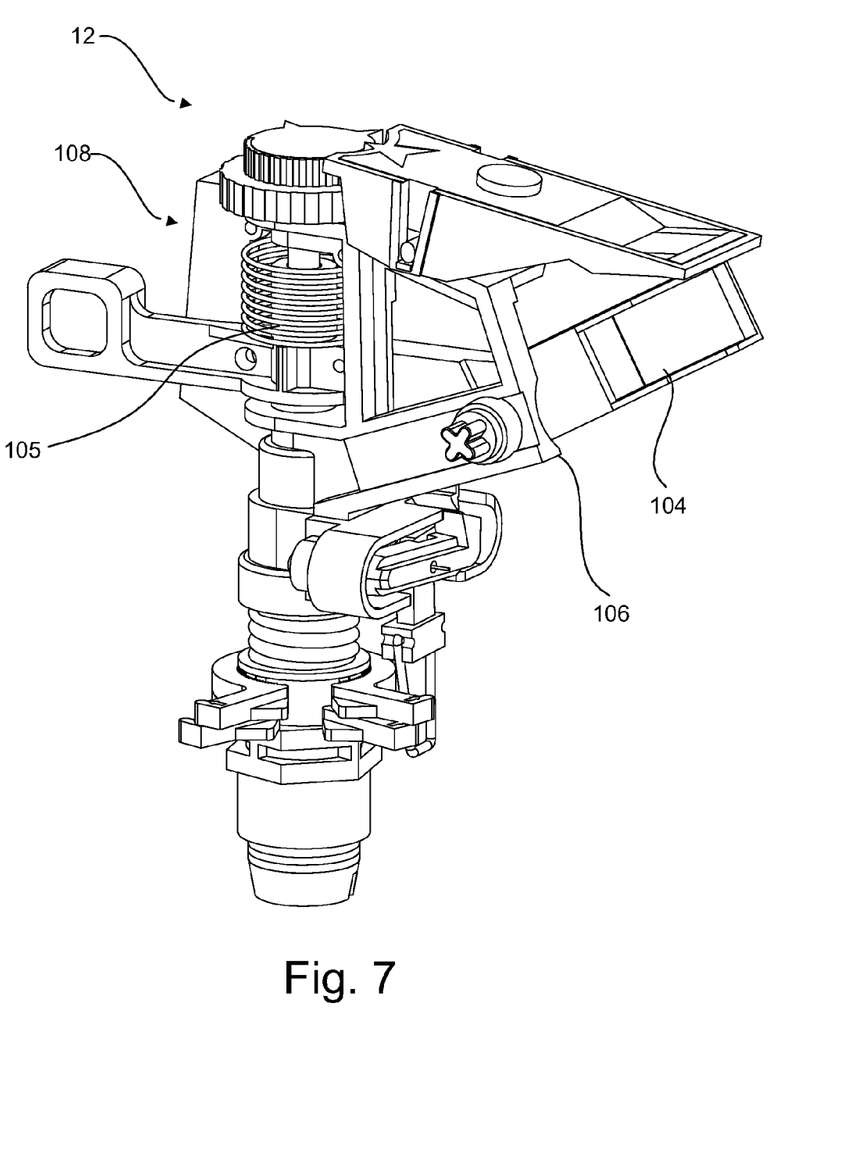
FIG. 7 is a perspective view of the impact sprinkler of the animal deterrent device illustrated in FIG. 1.

FIG. 7 comprises a perspective view of one embodiment of the sprinkler 12. In the embodiment illustrated in FIG. 6, the sprinkler comprises an impact rotor sprinkler 12. In FIG. 7, the illustrated sprinkler 12 comprises a pivoting impact arm 104 that is biased against the impact receiving member 106 via a spring 105. The force of a pressurized fluid separates the pivoting impact arm 104 from the impact receiving member 106. The spring 105 biases and propels the pivoting impact arm 104 back to the impact receiving member 106. The impact of the pivoting impact arm 104 on the impact receiving member 106 causes the head 108 of the impact sprinkler 12 to rotate. In one embodiment, the pivoting impact arm 104 is formed from a polymer-based material. The polymer-based material may be lighter than a pivoting impact arm 104 of metal. As result, the pivoting impact arm 104 of a polymer-based material may move back and forth in a rapid fashion and generate noise, thereby enhancing the deterrent effect of the device 10.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed.

What is claimed is:

1. A device for deterring entry of animals within an area, comprising:
    an impact irrigation sprinkler for providing a fluid spray pattern of water to an area;
    a sprinkler valve having at least an open and a closed state;
    a conduit coupled to the sprinkler and the valve, the conduit placing the valve in fluid communication with the sprinkler;
    a first coupling in fluid communication with the conduit for placing the valve in fluid communication with a pressurized fluid source;
    a signal-transmitting component in electrical communication with the sprinkler valve;
    a motion sensor in electrical communication with the signal-transmitting component;
    a light sensor in electrical communication with the signal-transmitting component, wherein the signal-transmitting component comprises logic circuitry configured to transmit an open-valve signal to the valve based on signals received from the motion sensor and the light sensor; and
    a second coupling downstream relative to the sprinkler valve, the second coupling enabling selective connection of a second irrigation sprinkler to the second coupling.

2. The device of claim 1, wherein, in a first lighting-based mode, the logic circuitry is configured to cause the signal-transmitting component to transmit the open-valve signal when a light-detected signal from the light sensor indicates that the light sensor has detected light less than or equal to a first threshold of light and a motion-detected signal is received from the motion sensor.

3. The device of claim 2, wherein, in a second lighting-based mode, the logic circuitry is configured to cause the signal-transmitting component to transmit the open-valve signal when the light-detected signal from the light sensor indicates that the light sensor has detected light greater than or equal to a second threshold of light and the motion-detected signal is received from the motion sensor.

4. The device of claim 3, wherein, in a third lighting-based mode, the logic circuitry is configured to cause the signal-transmitting component to transmit the open valve signal when the motion-detecting signal is received from the motion sensor irrespective of the light-detected signal.

5. The device of claim 4, further comprising a lighting-mode control having at least three positions: a first position corresponding to the first lighting-based mode, a second position corresponding to the second lighting-based mode, and a third position corresponding to the third lighting-based mode.

6. The device of claim 3, wherein the first threshold of light is equal to the second threshold of light.

7. The device of claim 2, wherein the motion sensor comprises a motion sensitivity component, the device further comprising a sensitivity control for adjusting a sensitivity of the motion sensor via the motion sensitivity component.

8. The device of claim 2, further comprising a duration control component for adjusting the duration in which the sprinkler valve remains in the open state in response to the motion-detected signal.

9. The device of claim 2, further comprising an override component configured to cause the signal-transmitting component to transmit the open-valve signal to the sprinkler valve in response to activation of an override control irrespective of signals sent by the motion sensor and the light sensor.

10. The device of claim 9, wherein the override control is positioned on a remote control device that wirelessly communicates with the override component.

11. The device of claim 2, wherein the logic circuitry comprises a frequency detection component configured to determine a frequency of transmission of motion-detected signals transmitted by the motion sensor and comprises an adjustment component configured to increase a time between transmission of open-valve signals to the sprinkler valve if the frequency of transmission of motion-detected signals exceeds a certain threshold with a specified period to time.

12. The device of claim 1, further comprising a third and fourth coupling, the third and fourth coupling being downstream relative to the sprinkler valve.

13. The device of claim 2, wherein the impact sprinkler comprises a pivoting impact arm of a polymer-based material.

14. A device for deterring entry of animals within an area, comprising:
    a base defining a fluid conduit within the base;
    an irrigation sprinkler for providing a fluid spray pattern of water to an area, the irrigation sprinkler being secured to the base and in fluid communication with the fluid conduit;
    a sprinkler valve secured to the base, the sprinkler valve comprising an open state in which fluid flows through the fluid conduit and a closed state in which fluid flow through the conduit is obstructed;
    a first coupling coupled to the base and in fluid communication with the fluid conduit;

a signal-transmitting component in electrical communication with the sprinkler valve, the signal-transmitting component being coupled to the base;

a motion sensor in electrical communication with the signal-transmitting component, the motion sensor being coupled to the base; and a light sensor in electrical communication with the signal-transmitting component, the light sensor being coupled to the base, wherein the signal-transmitting component comprises logic circuitry configured to transmit an open-valve signal to the valve based on signals received from the motion sensor and the light sensor, wherein the logic circuitry comprises a frequency detection component configured to determine a frequency of transmission of motion-detected signals transmitted by the motion sensor and comprises an adjustment component configured to automatically increase a time between transmission of open-valve signals to the sprinkler valve if the frequency of transmission of motion-detected signals exceeds a certain threshold within a specified period to time.

15. The device of claim 14, wherein the base comprises one or more tube-shaped structures.

16. The device of claim 14, wherein, in a first lighting-based mode, the logic circuitry is configured to cause the signal-transmitting component to transmit the open-valve signal when a light-detected signal from the light sensor indicates that the light sensor has detected light less than or equal to a first threshold of light and a motion-detected signal is received from the motion sensor.

17. The device of claim 16, wherein, in a second lighting-based mode, the logic circuitry is configured to cause the signal-transmitting component to transmit the open-valve signal when the light-detected signal from the light sensor indicates that the light sensor has detected light greater than or equal to a second threshold of light and the motion-detected signal is received from the motion sensor.

18. The device of claim 16, further comprising a duration control component for adjusting the duration in which the sprinkler valve remains in the open state in response to the motion-detected signal.

19. The device of claim 14, further comprising an override component configured to cause the signal-transmitting component to transmit the open-valve signal to the sprinkler valve in response to activation of an override control irrespective of signals sent by the motion sensor and the light sensor.

20. A device for deterring entry of animals within an area, comprising:

an irrigation sprinkler for providing a fluid spray pattern of water to an area;

a sprinkler valve having at least an open and a closed state;

a conduit coupled to the sprinkler and the valve, the conduit placing the valve in fluid communication with the sprinkler;

a first coupling in fluid communication with the conduit for placing the valve in fluid communication with a pressurized fluid source;

a signal-transmitting component in electrical communication with the sprinkler valve;

a motion sensor in electrical communication with the signal-transmitting component;

a light sensor in electrical communication with the signal-transmitting component, wherein the signal-transmitting component comprises logic circuitry configured to transmit an open-valve signal to the valve based on signals received from the motion sensor and the light sensor; and an override component configured to cause the signal-transmitting component to transmit the open-valve signal to the sprinkler valve in response to activation of an override control irrespective of signals sent by the motion sensor and the light sensor, wherein the override component is configured to maintain the sprinkler valve in the open state for a fixed and predetermined period of time in response to activation of a particular control.

* * * * *